United States Patent
Hofer

[11] 3,904,026
[45] Sept. 9, 1975

[54] COMBINE TOOTH ASSEMBLY

[76] Inventor: Walter David Hofer, Box. No. 580, Pincher Creek, Alberta, Canada

[22] Filed: Nov. 21, 1973

[21] Appl. No.: 417,970

[52] U.S. Cl. .................... 198/172; 56/364; 56/400; 56/400.21; 198/198
[51] Int. Cl.² ............................................ B65G 19/00
[58] Field of Search ................. 198/168, 172–176, 198/198, 200; 56/364, 400, 400.21

[56] References Cited
UNITED STATES PATENTS

| | | | |
|---|---|---|---|
| 2,351,144 | 6/1944 | Oehler | 56/364 |
| 2,881,580 | 4/1959 | Ashton | 56/364 |
| 3,099,347 | 7/1963 | Dahlquist | 198/198 |
| 3,344,908 | 10/1967 | Hofer | 198/198 |

*Primary Examiner*—Evon C. Blunk
*Assistant Examiner*—Joseph E. Valenza

[57] ABSTRACT

In a preferred embodiment of the invention, there is provided a flexible tooth and securing base strip, utilized with a perforated combine belt having spaced apart apertures in the nature of pairs for paired combine teeth one insertable through each aperture and securable by slot-forming leg-projections at each of opposite ends of the base strip mounted between the spaced-apart teeth extending through the respective slots one per slot, and the teeth each including a base flange of squared cross-section and having upwardly extending projections defining a space between the respective projections and the axis portion of the tooth extending upwardly and thereafter angling forwardly, the projections being on the rearward side of the axis, and the base strip legs being slidable around each of the axes with one leg sliding between the axis and the upwardly extending projections for each of the combine teeth, advantages including simplicity of mounting and dismounting to replace worn or broken teeth — one or more, and the flexibility of each respectively of the teeth and the base strip serving to avoid shearing off of the respective tooth or teeth when subjected to undue stresses.

10 Claims, 5 Drawing Figures

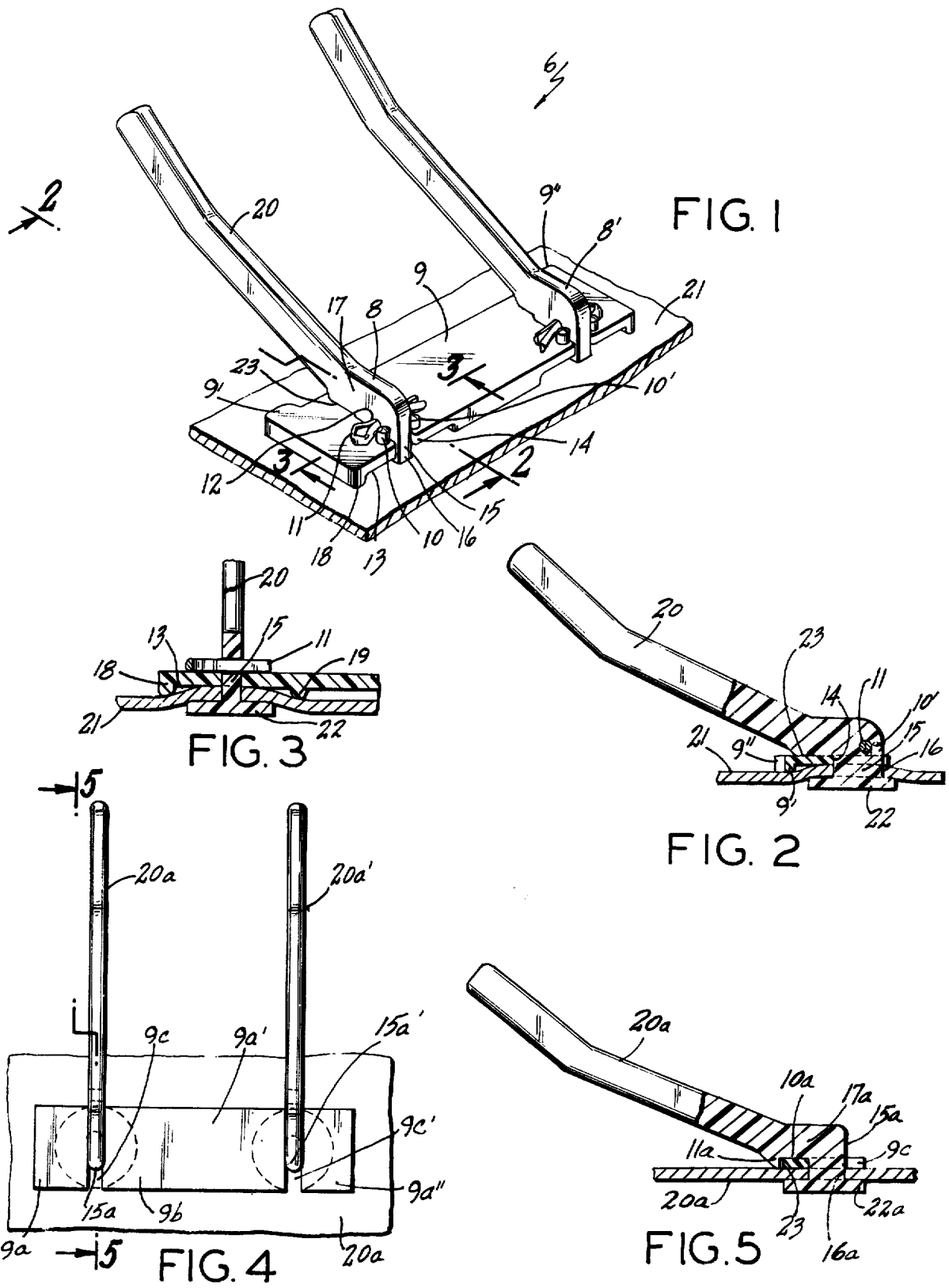

3,904,026

COMBINE TOOTH ASSEMBLY

This invention relates to combine teeth and the attaching mechanism and associated problems of such teeth.

BACKGROUND TO THE INVENTION DISCLOSURE

Prior to the present invention there has existed a major problem in the shearing of teeth from the combine belt during the operational use thereof in combining, and the problem has been further complicated by the notorious difficulty in replacing such teeth, as well as the cost of replacing both teeth in the double-tooth mounting type arrangement. There additionally is the consideration of retaining high efficiency in the nature of the teeth while hopefully avoiding these problems.

BROAD DESCRIPTION OF THE INVENTION

Accordingly, objects of the present invention include the overcoming of one or more of the problems and difficulties of the type referred to above, together with the obtaining of novel advantages not heretofore available.

Another object is to obtain a novel mechanism of anchoring securably the respective one or more, particularly spaced-apart paired tine-teeth to a combine belt, while concurrently obtaining a flexibility which decreases the possibility of shearing tine fingers while nevertheless retaining sufficient stiffness in the tine fingers as to retain a high level of operational efficiency.

Other objects become apparent from the preceding and following disclosure.

One or more objects of the present invention are obtained by the invention as defined herein.

Broadly the invention includes a combine tine-tooth and base-strip element utilizable therewith, the tine-tooth having a unitary base flange of preferably substantially rectangular cross-section with opposite upper and lower substantially flat faces preferably parallel to each other, the major proportion of the base of the tine-tooth being in the form of the base flange and remaining below a combine belt when mounted through a hole therein, and the tine-tooth including an elongated upright axis extending upwardly from the base flange's upper flat face for insertion through a combine belt hole; lateral to and unitary to and continuous with an upper portion of the upright axis, there extends an upright forwardly-extending structure having a lower about horizontal flat face which between the horizontal flat face and the base flange's upper flat face defines a slot-space within which slot-space the combine belt is locked by wedging and locking the base-strip element therein. Above the level that the lock-strip would be inserted into the slot space, the tine-tooth extends axially angularly forwardly in an upright direction as a tine finger extending from an upper portion of the elongated upright axis, and the entire tine tooth is of a semirigid composition of sufficient flexibility as to lend some flexibility to the tine finger and to its integral and continuing base portion also flexible such that the overall degree of flexibility substantially precludes the possibility of the snapping-off or shearing-off of the tine finger and/or the base thereof during normal combine belt operation thereby reducing cost of maintenance as well as the overall shape contributing to an improved ease of replacement of worn or otherwise broken tine teeth without any major loss of operational combine time. Extending in a direction along a plane parallel to the axial axis of the upright axis there is a key-projection structure extending in a path blocking withdrawal of a base-strip element wedgably insertable within the slot space; the base-strip element is mountable by insertion into above-noted slot space. The key-projection structure preferably extends downwardly from a forward end of the lower horizontal face of the forward structure; the key-projection structure may alternatively removably extend laterally horizontally from a point forwardly of and in the path of a barrier projection projecting from the lock-strip. The base-strip element is thus lockably slidable between the forward structure and the combine belt which is held snugly by the base flange. Preferably there are opposite ends of the base-strip element, one end within a separate slot of a separate tine-tooth than the remaining one of the opposite ends which is accordingly in a different separate slot of a different separate tine-tooth, the single base-strip element thereby locking tine teeth at opposite ends of the base-strip element into spaced-apart combine-belt mounting apertures. The belt is of any conventional type, while the tooth is preferably of a relatively rigid but semiflexible material, as noted above. The resistance to shearing or breaking is further enhanced by the insertable strip also being flexible to a preferably greater extent than heretofore, in order to "yield" to excessive forces to thereby provide against too rigid a mounting, as well as the semi-flexibility of the strip serving to facilitate the insertion thereof into a locking state. As viewed in side cross-sectional view, for example, the base flange being substantially of rectangular shape improves the resistance of the axis against twisting in its insertion within the hole of the belt, while not being of any complicated structure nor of any expensive construction, whereby tine-teeth are more expendable cost-wise when major wear and tear or blows render a tine tooth unusable. Similarly, the shape and structure of the tine teeth and fingers thereof are of sufficiently simple shape and structure in design as to facilitate low cost manufacture as well as easy installation and removal without requiring any major alteration(s) in design or loss of operational time for the combine.

THE FIGURES

FIG. 1 illustrates a side perspective view of a preferred paired-teeth and interlocking base-strip element as mounted on a conventional combine belt shown in in-part view.

FIG. 2 illustrates a side view in cross-section as viewed along lines 2—2 of FIG. 1.

FIG. 3 illustates a rearward view in cross-section as viewed along lines 3—3 of FIG. 1.

FIG. 4 and 5 illustrate an alternate embodiment in elevation plan view of the paired-teeth and interlocking base-strip element, as mounted on a conventional combine belt, and along line 5—5 of FIG. 4.

DETAILED DESCRIPTION OF THE INVENTION

With further reference to the above-noted Figures, in greater detailed description, reference is first made to the preferred embodiment of FIGS. 1 through 3. There is disclosed a unit 6 of paired tine teeth 8 and 8', having an intermediate base-strip element 9 with opposite strip ends 9' and 9" at each end defining a rearward open-ended slot 14 extending forwardly in the strip, and with the tine tooth structure defining a space 23 between a horizontal lower face of a horizontal shaft portion and an upper face of a flange 22 of the base. An upright lock-strip projection 10 is secured by pin projection 11 of the tooth which prevents the withdrawal of the base-strip element 9 by sliding it forwardly upon withdrawal of pin projection 11, from the through aperture 12. The space 13 provided under the strip end 9' inwardly of leg flange 18 of the base-strip element end 9' provides a wedge-space into which the combine belt adjacent the hole 16 in the combine belt 21 is wedgable by the upper face of the base flange 22 which extends laterally from the upright tooth shaft 15 through the slot 14. The horizontal shaft structure 17 extends forwardly from an upper end of the shaft 15, and from the horizontal shaft structure the tine finger 20 extends uprightly angularly upwardly in a forward direction. The central support structure 19 of the base-strip element 9 serves the same function as the leg 18, in securely locking-in the belt between the flange upper surface and the lower face of the base-strip element.

In the alternate embodiment of FIGS. 4 and 5, the locking pin 11a is integral with the horizontal structure 17a and extends vertically downwardly across the path of the barrier structure 10a of the base-strip element 9a' having opposite ends 9a and 9a'', with the rearward open-ended slots 9c and 9c' for insertion of the base-strip element 9a' around upright shafts 9c and 9c', and the tine fingers 20a and 20a' extending substantially the same as the FIG. 1 embodiment. As noted, the number in "prime" correspond in FIGS. 4 and 5 to the numerals identified in the discussion of the embodiment of FIGS. 1–3.

It is within the scope and spirit of the present invention to utilize conventional or other desired materials of composition within the confines of the above description, such as metal or plastic, either or both for the teeth and/or the base-strip element, as well as to make obvious variations in shape and design and substitution of equivalents to the extent as would be obvious to a person of ordinary skill in this particular art.

Accordingly, there may be a double spaced-apart tooth arrangement or alternately a single tooth for use in a drum type pickup, and for bailor type and pickup reel type arrangements. The inventive shape of the tooth enables longer ware because of the depth of material, and the tooth will retain its original shape much longer than a round tooth, for the same reason. The narrow shape of the tooth allows the tooth to flex sideways quite easily, therefore minimizing the chance of picking up rocks or the like. This shape also greatly improves the stripping action of the straw from the pickup to the table of the combine.

Accordingly, the present invention represents a major advance in the technology of combine teeth.

I claim:

1. A combine detachable tooth device for mounting through an aperture of a combine tooth-mounting belt, comprising in combination: a combine tooth having a central shaft and having a base flange extending transversely laterally to and unitarily continuous with the central shaft, the central shaft extending axially and being shaped to include a bend at a point intermediate of the shaft's axial length at a location spaced a predetermined distance from the base-flange such that when the shaft extends upwardly when mounted through the aperture of the combine tooth-mounting belt from an underside of the belt a major proportion of said predetermined distance remains between an upper face of the belt and said intermediate point, distally located from and in juxtaposition to and fixedly unitarily continuous with the intermediate point a shaft lower-face portion of the shaft being shaped to extend about horizontally while maintaining spacing at about said major proportion between the lower-face portion and the upper face of the combine tooth-mounting belt; a base-strip element having upper and lower substantially flat faces about parallel to one-another defining through-space therethrough of a size and shape receivable of said shaft and further defining an open-ended slot of a width of a predetermined width distance substantially equal to and at least as great as a narrowest diameter of the shaft below and in juxtaposition with said intermediate point, and the base-strip element being insertable beneath the shaft lower-face portion within said distance of the major proportion with structure defining said open-ended slot extending on each of opposite sides of the shaft below the bend, the base-strip element and the combine tooth having interlocking structure securing the base-strip element in the inserted state, the combine tooth including at least one projection extending in a substantially vertical plane and positioned as an abutment preventing accidental withdrawal of the base-strip element from its inserted state.

2. A combine detachable tooth device of claim 1, in which said projection extends downwardly distally positioned from and in juxtaposition to said lower-face portion extending from said horizontal axis into space of said predetermined distance.

3. A combine detachable tooth device of claim 2, in which said projection extends downwardly from said lower-face spaced forwardly from said shaft a distance about equal to a forward portion of the base strip element insertable between the projection and said shaft.

4. A combine detachable tooth device of claim 1, in which said basestrip element is substantially flexible.

5. A combine detachable tooth device of claim 4, in which the base-strip element includes two separate slots, one at each of opposite ends defined by first and second legs at each of opposite ends, and being insertable concurrently around separate axes of two spaced-apart combine teeth by flexing with the respective legs extending horizontally in a transverse lateral direction relative to the direction of bend of the axes of the respective combine teeth, and including a second combine tooth of a shape and structure substantially identical to the other combine tooth of the two.

6. A combine detachable tooth device of claim 5, including a combine tooth-mounting belt having paired apertures with the respective apertures being spaced from one-another a second predetermined distance about equal to the distance between adjacent ends of the two separate slots.

7. A combine detachable tooth device of claim 6, in which the respective two combine teeth are each composed of semi-flexible composition.

8. A combine detachable tooth device of claim 6, in which the base-flange is of a shape having a side rectangular cross-section.

9. A combine detachable tooth device of claim 1, in which the base-flange is of a shape having a side rectangular crosssection.

10. A combine detachable tooth device for mounting through an aperture of a combine tooth-mounting belt, comprising in combination: a combine tooth having a central shaft and having a base flange extending transversely laterally to and unitarily continuous with the central shaft, the central shaft extending axially and being shaped to include a bend at a point intermediate of the shaft's axial length at a location spaced a predetermined distance from the base-flange such that when the shaft extends upwardly when mounted through the aperture of the combine tooth-mounting belt from an underside of the belt a major proportion of said predetermined distance remains between an upper face of the belt and said intermediate point, distally located from and in juxtaposition to and fixedly unitarily continuous with the intermediate point a shaft lower-face portion of the shaft being shaped to extend about horizontally while maintaining spacing at about said major proportion between the lower-face portion and the upper face of the combine tooth-mounting belt; a base-strip element having upper and lower substantially flat faces about parallel to one-another defining through-space therethrough of a size and shape receivable of said shaft and further defining an open-ended slot of width of a predetermined width distance substantially equal to and at least as great as a narrowest diameter of the shaft below and in juxtaposition with said intermediate point, and the base-strip element being insertable beneath the shaft lowerface portion within said distance of the major proportion with structure defining said open-ended slot extending on each of opposite sides of the shaft below the bend, the base-strip element and the combine tooth having interlocking structure securing the base-strip element in the inserted state, the shaft including at the intermediate point a laterally extending through-aperture, and the interlocking structure including a pin insertable into the laterally extending through-aperture and extending therefrom when inserted, and the base-strip element including an upright projection aligned within the path of the pin when withdrawing the base-strip element.

* * * * *